US012091040B2

(12) United States Patent
Sakai et al.

(10) Patent No.: US 12,091,040 B2
(45) Date of Patent: Sep. 17, 2024

(54) VEHICLE CLEANER SYSTEM

(71) Applicant: KOITO MANUFACTURING CO., LTD., Tokyo (JP)

(72) Inventors: Masaru Sakai, Shizuoka (JP); Kazuki Kawamura, Shizuoka (JP); Akinobu Kubota, Shizuoka (JP); Masaaki Sato, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/977,615

(22) PCT Filed: Mar. 7, 2019

(86) PCT No.: PCT/JP2019/009110
§ 371 (c)(1),
(2) Date: Sep. 2, 2020

(87) PCT Pub. No.: WO2019/172377
PCT Pub. Date: Sep. 12, 2019

(65) Prior Publication Data
US 2021/0039670 A1 Feb. 11, 2021

(30) Foreign Application Priority Data
Mar. 7, 2018 (JP) ................. 2018-041033

(51) Int. Cl.
*B60W 60/00* (2020.01)
*B60S 1/46* (2006.01)
(Continued)

(52) U.S. Cl.
CPC ............. *B60W 60/001* (2020.02); *B60S 1/46* (2013.01); *B60W 10/04* (2013.01); *B60W 10/18* (2013.01);
(Continued)

(58) Field of Classification Search
None
See application file for complete search history.

(56) References Cited

U.S. PATENT DOCUMENTS

| 10,173,646 | B1 * | 1/2019 | Rice ....................... B60S 1/485 |
| 10,222,796 | B2 * | 3/2019 | Ichikawa ............. G05D 1/0061 |

(Continued)

FOREIGN PATENT DOCUMENTS

| JP | 2016-179767 A | 10/2016 |
| JP | 2016-187990 A | 11/2016 |

(Continued)

OTHER PUBLICATIONS

Extended European Search Report dated Nov. 11, 2021, issued by the European Patent Office in counterpart European Patent Application No. 19764550.0.

(Continued)

*Primary Examiner* — Hunter B Lonsberry
*Assistant Examiner* — Paysun Wu
(74) *Attorney, Agent, or Firm* — Sughrue Mion, PLLC

(57) ABSTRACT

A vehicle cleaner system are mounted on an autonomous driving vehicle including a vehicle control unit capable of selectively executing an autonomous driving mode and a manual driving mode. The vehicle cleaner system includes: a cleaner unit configured to clean an external sensor; and a cleaner control unit configured to control the cleaner unit. When the vehicle control unit switches from the manual driving mode to the autonomous driving mode, the vehicle control unit is configured such that, after the cleaner control unit causes the cleaner unit to clean the external sensor or after a diagnosis is performed to ascertain whether or not the external sensor needs to be cleaned, the manual driving mode is switched to the autonomous driving mode.

10 Claims, 8 Drawing Sheets

(51) Int. Cl.
  *B60W 10/04* (2006.01)
  *B60W 10/18* (2012.01)
  *B60W 10/20* (2006.01)
  *B60W 50/02* (2012.01)
  *B60W 50/14* (2020.01)

(52) U.S. Cl.
  CPC ........ *B60W 10/20* (2013.01); *B60W 50/0205* (2013.01); *B60W 50/14* (2013.01); *B60W 60/0051* (2020.02); *B60W 2050/146* (2013.01); *B60W 2420/403* (2013.01); *B60W 2420/408* (2024.01)

(56) References Cited

U.S. PATENT DOCUMENTS

| | | |
|---|---|---|
| 2014/0156133 A1 | 6/2014 | Cullinane et al. |
| 2014/0156134 A1 | 6/2014 | Cullinane et al. |
| 2014/0330478 A1 | 11/2014 | Cullinane et al. |
| 2015/0284009 A1 | 10/2015 | Cullinane et al. |
| 2016/0200326 A1 | 7/2016 | Cullinane et al. |
| 2016/0282865 A1 | 9/2016 | Shimizu et al. |
| 2017/0043788 A1 | 2/2017 | Cullinane et al. |
| 2017/0253253 A1 | 9/2017 | Cullinane et al. |
| 2018/0009418 A1 | 1/2018 | Newman |
| 2018/0043904 A1 | 2/2018 | Cullinane et al. |
| 2018/0046183 A1 | 2/2018 | Peters et al. |
| 2018/0215396 A1* | 8/2018 | Miyahara ............. G05D 1/0061 |
| 2018/0334173 A1 | 11/2018 | Cullinane et al. |
| 2018/0357496 A1 | 12/2018 | Chiba et al. |
| 2019/0100168 A1* | 4/2019 | Krishnan ............... B60S 1/0818 |
| 2019/0291746 A1 | 9/2019 | Cullinane et al. |
| 2020/0210728 A1 | 7/2020 | Chiba et al. |
| 2020/0269866 A1* | 8/2020 | Choi ....................... B60R 16/03 |
| 2021/0033411 A1* | 2/2021 | Violetta ............. G01C 21/3484 |
| 2021/0178959 A1* | 6/2021 | Ishida ................ G08G 1/09623 |

FOREIGN PATENT DOCUMENTS

| | | |
|---|---|---|
| JP | 2016-212905 A | 12/2016 |
| JP | 2017-102007 A | 6/2017 |

OTHER PUBLICATIONS

International Search Report dated May 14, 2019 (PCT/ISA/210) issued by the International Searching Authority for International Application No. PCT/JP2019/009110.

Written Opinion dated May 14, 2019 (PCT/ISA/237) issued by the International Searching Authority for International Application No. PCT/JP2019/009110.

* cited by examiner

VEHICLE CLEANER SYSTEM

CROSS-REFERENCE TO RELATED APPLICATIONS

This application is a National Phase Entry of PCT International Application No. PCT/JP2019/009110, filed on Mar. 7, 2019, which claims priority to Japanese Patent Application No. 2018-041033 filed on Mar. 7, 2018, the contents of all of which are incorporated herein by reference in their entirety.

TECHNICAL FIELD

The present invention relates to a vehicle cleaner system.

BACKGROUND ART

A vehicle cleaner that discharges a cleaning liquid to a sensor or the like mounted on a vehicle is known in Patent Literature 1 or the like.

CITATION LIST

Patent Literature

Patent Literature 1: JP-A-2016-187990

SUMMARY OF INVENTION

Technical Problem

In an autonomous driving vehicle capable of executing a manual driving mode and an autonomous driving mode, it is required to clean an external sensor acquiring information on the outside of the vehicle when executing the autonomous driving mode. However, when the vehicle cleaner is operated at the time of switching from the manual driving mode to the autonomous driving mode, since cleaning by a cleaner takes time, it may be difficult to quickly switch the driving mode.

Therefore, an object of the present invention is to provide a vehicle cleaner system capable of keeping an external sensor in a clean state when switching from a manual driving mode to an autonomous driving mode.

Solution to Problem

According to one aspect of the present invention, there is provided a vehicle cleaner system.

The vehicle cleaner system mounted on an autonomous driving vehicle including a vehicle control unit capable of selectively executing an autonomous driving mode in which an accelerator control signal, a brake control signal, and a steering control signal are generated in accordance with an output from an external sensor acquiring information on outside of the vehicle and a manual driving mode in which the accelerator control signal, the brake control signal, and the steering control signal are generated independently of the output from the external sensor includes:
 a cleaner unit configured to clean the external sensor; and
 a cleaner control unit configured to control the cleaner unit.

When the vehicle control unit switches from the manual driving mode to the autonomous driving mode, the vehicle control unit is configured such that, after the cleaner control unit causes the cleaner unit to clean the external sensor or after a diagnosis is performed to ascertain whether or not the external sensor needs to be cleaned, the manual driving mode is switched to the autonomous driving mode.

Advantageous Effects of Invention

According to one aspect of the present invention, an object thereof is to provide the vehicle cleaner system capable of keeping the external sensor in a clean state when switching from the manual driving mode to the autonomous driving mode.

DESCRIPTION OF EMBODIMENTS

Figure 1:
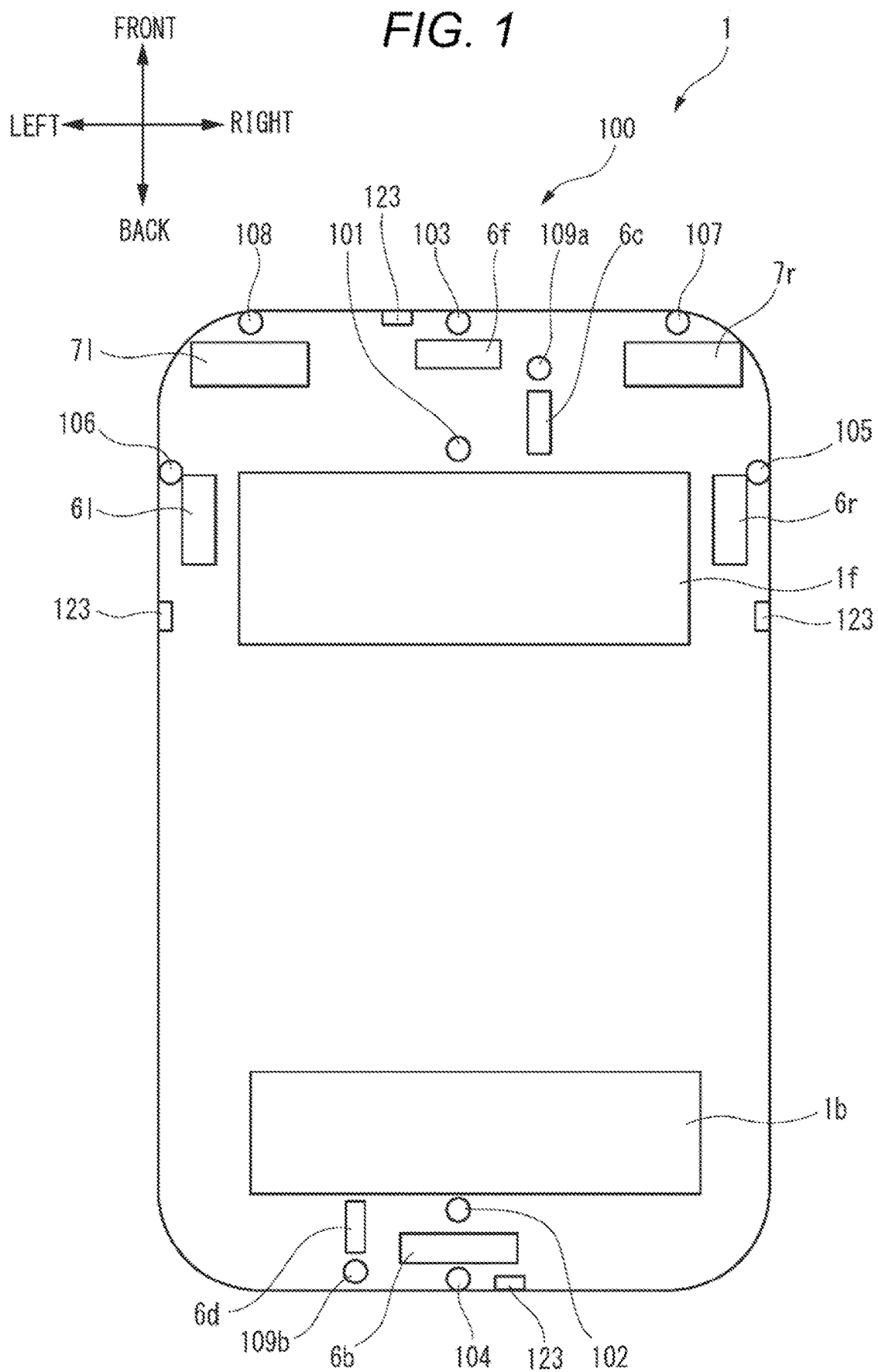
FIG. 1 is a top view of a vehicle equipped with a vehicle cleaner system according to the present invention.

Hereinafter, a first embodiment of the present invention will be described with reference to the drawings. Incidentally, members having the same reference numbers as members that have been described in the description of the present embodiment will be omitted for convenience of description. In addition, dimensions of the members shown in the drawings may be different from actual dimensions thereof for convenience of description.

In the description of the present embodiment, a "left-right direction", a "front-back direction", and an "upper-lower direction" are appropriately referred to, for convenience of description. These directions are relative directions set for a vehicle 1 shown in FIG. 1. Here, the "upper-lower direction" is a direction including an "upper direction" and a "lower direction". The "front-back direction" is a direction including a "front direction" and a "back direction". The "left-right direction" is a direction including a "left direction" and a "right direction".

FIG. 1 is a top view of the vehicle 1 in which a vehicle cleaner system 100 (hereinafter, referred to as a cleaner system 100) according to the present embodiment is mounted. The vehicle 1 includes the cleaner system 100. In the present embodiment, the vehicle 1 is an automobile that can travel in an autonomous driving mode.

Figure 2:
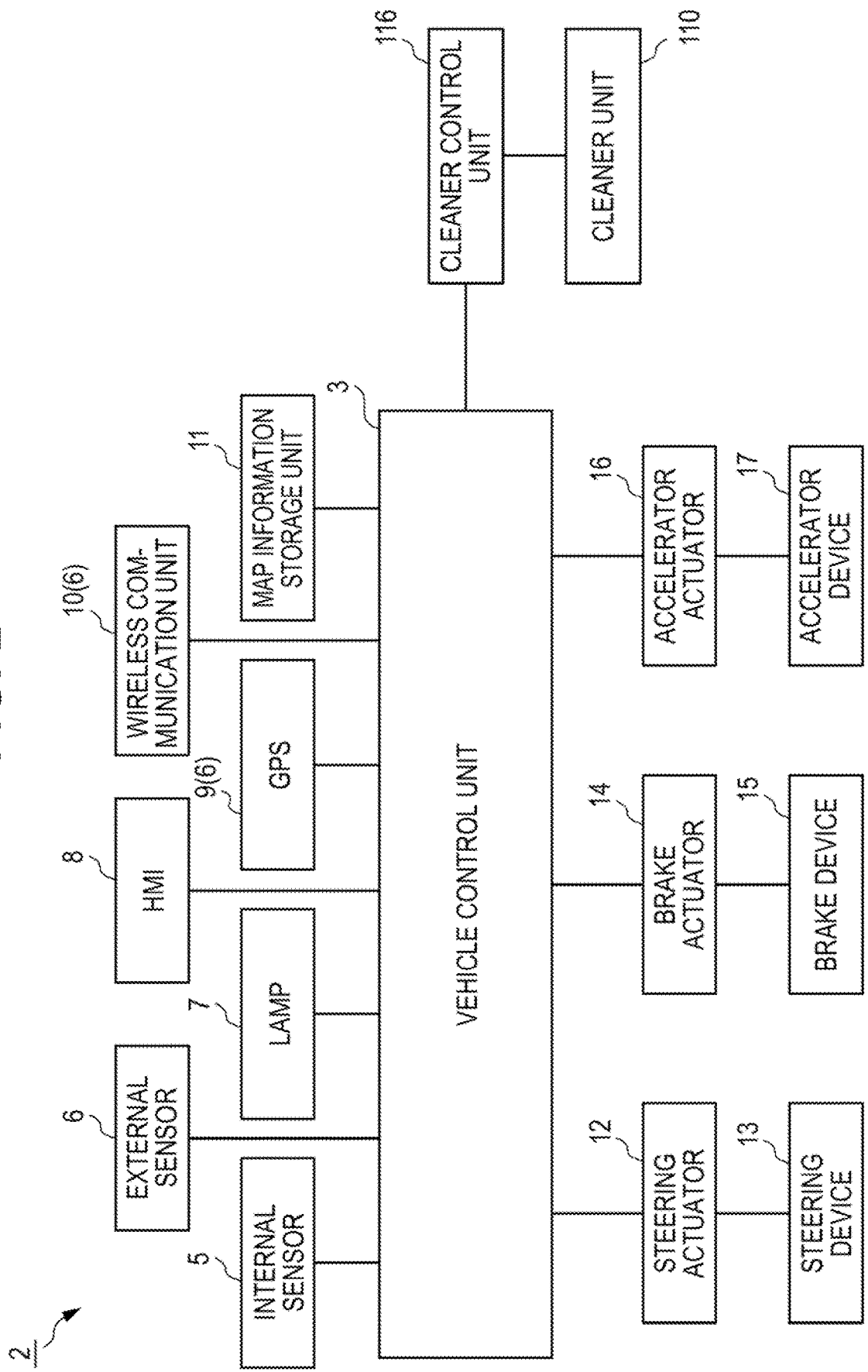
FIG. 2 is a block diagram of a vehicle system.

First, a vehicle system 2 of the vehicle 1 will be described with reference to FIG. 2. FIG. 2 is a block diagram of the vehicle system 2. As shown in FIG. 2, the vehicle system 2 includes a vehicle control unit 3, an internal sensor 5, an external sensor 6, a lamp 7, a human machine interface (HMI) 8, a global positioning system (GPS) 9, a wireless communication unit 10, and a map information storage unit 11. The vehicle system 2 further includes a steering actuator 12, a steering device 13, a brake actuator 14, a brake device 15, an accelerator actuator 16, and an accelerator device 17.

The vehicle control unit 3 includes an electronic control unit (ECU). The vehicle control unit 3 includes a processor such as a central processing unit (CPU), a read only memory (ROM) in which various vehicle control programs are stored, and a random access memory (RAM) in which vehicle control data are temporarily stored. The processor is configured to load a program designated from the various vehicle control programs stored in the ROM onto the RAM and executes various processes in cooperation with the RAM. The vehicle control unit 3 is configured to control traveling of the vehicle 1.

The lamp 7 is at least one of a headlamp or a position lamp provided at a front portion of the vehicle 1, a rear combination lamp provided at a back portion of the vehicle 1, a turn signal lamp provided on the front portion or a side portion of the vehicle, and various lamps for notifying a pedestrian and a driver of other vehicles of a status of a host vehicle.

The HMI 8 includes an input unit that receives an input operation from a user, and an output unit that outputs traveling information or the like to the user. The input unit includes a steering wheel, an accelerator pedal, a brake pedal, a driving mode switching switch that switches a driving mode of the vehicle 1, or the like. The output unit is a display that displays various traveling information.

The internal sensor 5 is a sensor capable of acquiring information of the host vehicle. The internal sensor 5 is, for example, at least one of an acceleration sensor, a vehicle speed sensor, a wheel speed sensor, and a gyro sensor. The internal sensor 5 is configured to acquire information of the host vehicle including a traveling state of the vehicle 1 and output the information to the vehicle control unit 3.

The internal sensor 5 may include a sensor that detects a displacement of the HMI 8, a seating sensor that detects whether the user is sitting on a seat, a face orientation sensor that detects a direction of a face of the user, a human detection sensor that detects whether or not there is a person in the vehicle, or the like.

The external sensor 6 is a sensor capable of acquiring information on the outside of the host vehicle. The external sensor is, for example, at least one of a camera, a radar, a LiDAR, the GPS 9, the wireless communication unit 10, or the like. The external sensor 6 is configured to acquire information on the outside of the host vehicle including a surrounding environment of the vehicle 1 (other vehicle, the pedestrian, a road shape, a traffic sign, an obstacle, or the like) and output the information to the vehicle control unit 3. Alternatively, the external sensor 6 may include a weather sensor that detects a weather condition, an illuminance sensor that detects an illuminance of the surrounding environment of the vehicle 1, or the like.

The camera is, for example, a camera including an image pickup element such as a charge-coupled device (CCD) or a complementary MOS (CMOS). The camera is a camera that detects visible light or an infrared camera that detects infrared rays.

The radar is a millimeter-wave radar, a microwave radar, a laser radar, or the like.

The LiDAR is an abbreviation for light detection and ranging or laser imaging detection and ranging. The LiDAR is a sensor that generally emits non-visible light forward and acquires information such as a distance to an object, a shape of the object, a material of the object, a color of the object, or the like based on the emitted light and return light.

The GPS 9, which is a kind of the external sensor 6, is configured to acquire the current position information of the vehicle 1 by measuring a distance of a plurality of artificial satellites with respect to the host vehicle 1, and output the acquired current position information to the vehicle control unit 3. The wireless communication unit 10, which is a kind of the external sensor 6, is configured to receive traveling information of another vehicle around the vehicle 1 from the other vehicle and transmit the traveling information of the vehicle 1 to the other vehicle (inter-vehicle communication). In addition, the wireless communication unit 10 is configured to receive infrastructure information from infrastructure equipment such as a traffic light or a sign lamp and transmit the traveling information of the vehicle 1 to the infrastructure equipment (road-to-vehicle communication). The map information storage unit 11 is an external storage device such as a hard disk drive in which map information is stored, and is configured to output the map information to the vehicle control unit 3.

The vehicle control unit 3 is configured to input an output from the internal sensor 5 that detects a displacement of an operator operated by a user such as the steering wheel, the accelerator pedal, and the brake pedal, an output from the internal sensor 5 that detects a state of the vehicle, such as the vehicle speed sensor, the vehicle wheel speed sensor, the acceleration sensor, and the yaw rate sensor, and an output from the external sensor 6 that acquires the information on the outside of the vehicle 1. The vehicle control unit 3 is configured to generate a steering control signal, an accelerator control signal, and a brake control signal based on these outputs, and control (process) these signals as necessary.

The steering actuator 12 is configured to receive the steering control signal from the vehicle control unit 3 and control the steering device 13 based on the received steering control signal. The brake actuator 14 is configured to receive the brake control signal from the vehicle control unit 3 and control the brake device 15 based on the received brake control signal. The accelerator actuator 16 is configured to receive the accelerator control signal from the vehicle control unit 3 and control the accelerator device 17 based on the received accelerator control signal.

The vehicle 1 can travel in the autonomous driving mode and a manual driving mode. The vehicle control unit 3 can selectively execute the autonomous driving mode and the manual driving mode.

In the autonomous driving mode, the vehicle control unit 3 automatically generates the steering control signal, the accelerator control signal, and the brake control signal in accordance with the output from the external sensor 6 that acquires the information on the outside of the vehicle 1. The vehicle control unit 3 automatically generates the steering control signal, the accelerator control signal, and the brake control signal in accordance with the output from the external sensor 6, regardless of the output from the internal sensor 5 that detects the displacement of the operator that can be operated by the user.

For example, in the autonomous driving mode, the vehicle control unit 3 automatically generates the steering control signal, the accelerator control signal, and the brake control signal based on surrounding environment information in front of the vehicle 1 acquired by a front camera 6c, the current position information of the GPS 9, the map information stored in the map information storage unit 11, or the like. In the autonomous driving mode, the vehicle 1 is driven independently of the user.

In the manual driving mode, the vehicle control unit 3 normally generates the steering control signal, the accelerator control signal, and the brake control signal regardless of the output from the external sensor 6. That is, in the manual driving mode, the vehicle control unit 3 generates the steering control signal based on the operation of the steering wheel of the user, regardless of the output from the external sensor 6. The vehicle control unit 3 normally generates the accelerator control signal based on the operation of the accelerator pedal of the user, regardless of the output from the external sensor 6. The vehicle control unit 3 generates the brake control signal based on the operation of the brake pedal of the user, regardless of the output of from external sensor 6. In the manual driving mode, the vehicle 1 is normally driven by the user.

In the manual driving mode, the vehicle control unit 3 may execute an anti-lock brake control for controlling the brake control signal in accordance with the output from the vehicle wheel speed sensor, which is the internal sensor 5, for example. In the manual driving mode, the vehicle control unit 3 may execute a skid prevention control (electric stability control), a traction control, or the like, which controls at least one of the steering control signal, the accelerator control signal, and the brake control signal in accordance with the output from a steering angle sensor, the vehicle wheel speed sensor, and the yaw rate sensor that are the internal sensors 5.

Alternatively, in the manual driving mode, the vehicle control unit 3 may execute a pre-crash control and a collision avoidance control for generating the steering control signal and the brake control signal in accordance with the output from the external sensor 6 such as the front camera 6c in an emergency. In this manner, in the manual driving mode, the vehicle control unit 3 may generate at least one of the steering control signal, the accelerator control signal, and the brake control signal in accordance with the output from the external sensor 6 in an emergency.

In the manual driving mode, a trigger for generating the steering control signal, the accelerator control signal, and the brake control signal is normally a displacement of an operator such as the steering wheel, the accelerator pedal, and the brake pedal operated by the user. In the manual driving mode, the vehicle control unit 3 may normally control (process) a signal such as the steering control signal, the accelerator control signal, and the brake control signal generated by the displacement of the operator in accordance with the output from the internal sensor 5 or the external sensor 6. In the present embodiment, the so-called assist driving mode that assists the driving of the user in accordance with the output from the internal sensor 5 or the external sensor 6 is one form of the manual driving mode.

According to the definitions of levels 0 to 5 of the autonomous driving mode currently known as of 2018, the autonomous driving mode of the present embodiment corresponds to levels 3 to 5 (except for an emergency or the like), and the manual driving mode of the present embodiment corresponds to levels 0 to 2.

Referring back to FIG. 1, the vehicle 1 includes, as the external sensor 6, a front LiDAR 6f, a back LiDAR 6b, a right LiDAR 6r, a left LiDAR 6l, the front camera 6c, and a back camera 6d. The front LiDAR 6f is configured to acquire information on a front side of the vehicle 1. The back LiDAR 6b is configured to acquire information on a back side of the vehicle 1. The right LiDAR 6r is configured to acquire information on a right side of the vehicle 1. The left LiDAR 6l is configured to acquire information on a left side of the vehicle 1. The front camera 6c is configured to acquire information on the front side of the vehicle 1. The back camera 6d is configured to acquire information on the back side of the vehicle 1.

In the example shown in FIG. 1, the front LiDAR 6f is provided on a front portion of the vehicle 1, the back LiDAR 6b is provided on a back portion of the vehicle 1, the right LiDAR 6r is provided on a right portion of the vehicle 1, and the left LiDAR 6l is provided on a left portion of the vehicle 1, but the present invention is not limited to this example. For example, the front LiDAR, the back LiDAR, the right LiDAR, and the left LiDAR may be collectively arranged on the ceiling of the vehicle 1.

The vehicle 1 includes a right headlamp 7r and a left headlamp 7l as the lamp 7. The right headlamp 7r is provided on a right portion on the font portion of the vehicle 1, and the left headlamp 7l is provided on the left portion on the front portion of the vehicle 1. The right headlamp 7r is provided on a right side of the left headlamp 7l.

The vehicle 1 includes a front window 1f and a rear window 1b.

The vehicle 1 includes the cleaner system 100 according to the embodiment of the present invention. The cleaner system 100 is a system that removes foreign matters such as a water droplet, mud, dust, or the like adhering to an object to be cleaned using a cleaning medium. In the present embodiment, the cleaner system 100 is a front window washer (hereinafter, referred to as a front WW) 101, a back window washer (hereinafter, referred to as a back WW) 102, a front LiDAR cleaner (hereinafter referred to as a front LC) 103, and a back LiDAR cleaner (hereinafter, referred to as a back LC) 104, a right LiDAR cleaner (hereinafter referred to as a right LC) 105, and a left LiDAR cleaner (hereinafter, referred to as a left LC) 106, a right headlamp cleaner (hereinafter referred to as a right HC) 107, and a left headlamp cleaner (hereinafter referred to as a left HC) 108, a front camera cleaner 109a, and aback camera cleaner 109b. Each of the cleaners 101 to 109b includes one or more nozzles, and discharges the cleaning medium such as a cleaning liquid or air from the nozzle toward the object to be cleaned. Incidentally, each of the cleaners 101 to 109b may be referred to as a cleaner unit 110.

The front WW 101 can clean the front window 1f. The back WW 102 can clean the rear window 1b. The front LC 103 can clean the front LiDAR 6f. The back LC 104 can clean the back LiDAR 6b. The right LC 105 can clean the right LiDAR 6r. The left LC 106 can clean the left LiDAR 6l. The right HC 107 can clean the right headlamp 7r. The left HC 108 can clean the left headlamp 7l. The front camera cleaner 109a can clean the front camera 6c. The back camera cleaner 109b can clean the back camera 6d.

Figure 3:
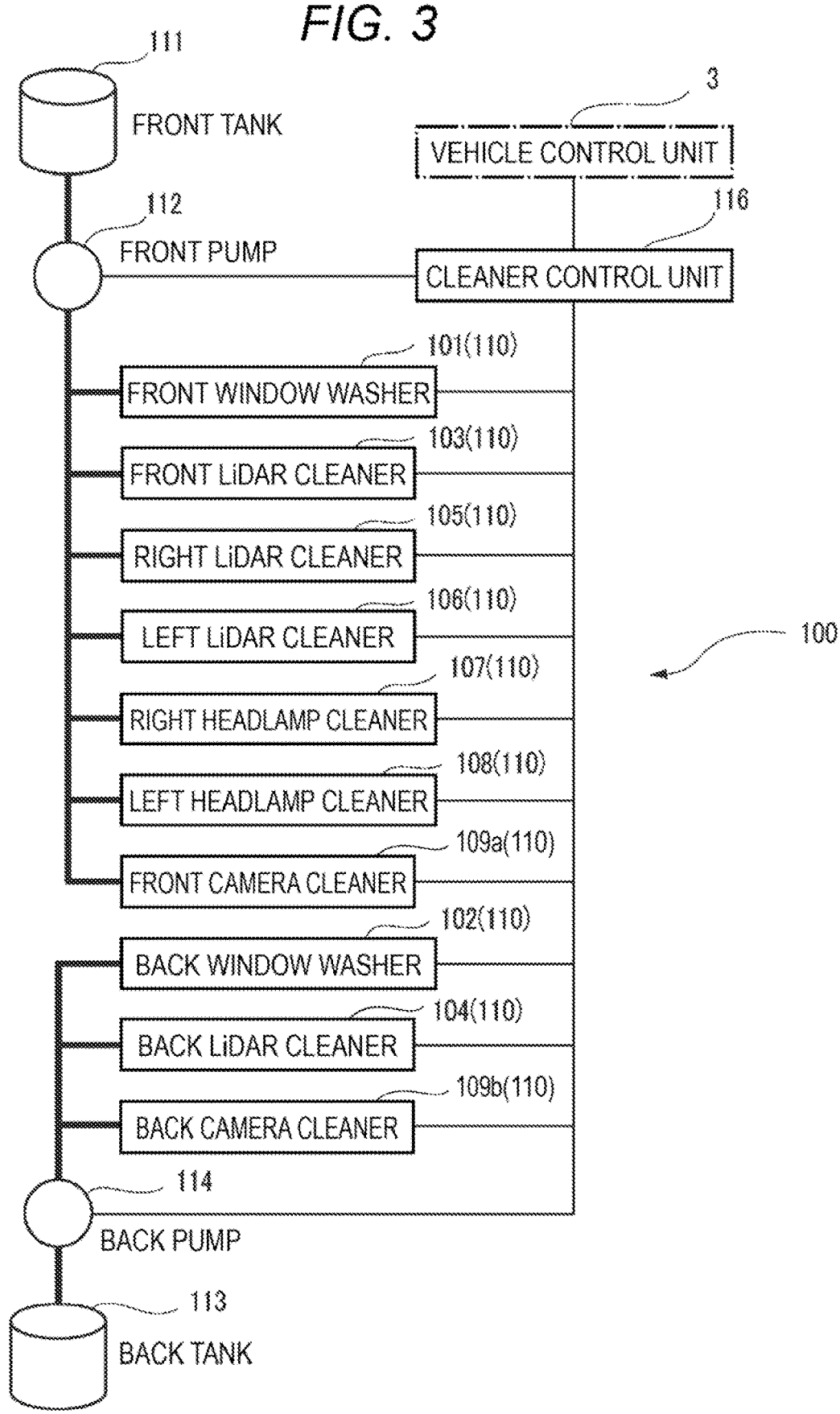
FIG. 3 is a schematic view of the vehicle cleaner system.

FIG. 3 is a schematic view of the cleaner system 100. The cleaner system 100 includes, in addition to the cleaner units 101 to 109b, a front tank 111, a front pump 112, a back tank 113, a back pump 114, and a cleaner control unit 116 (control unit).

The front WW 101, the front LC 103, the right LC 105, the left LC 106, the right HC 107, the left HC 108, and the front camera cleaner 109a are connected to the front tank 111 via the front pump 112. The front pump 112 sends the cleaning liquid stored in the front tank 111 to the front WW 101, the front LC 103, the right LC 105, the left LC 106, the right HC 107, the left HC 108, and the front camera cleaner 109a.

The back WW 102, the back LC 104, and the back camera cleaner 109b are connected to the back tank 113 via the back pump 114. The back pump 114 sends the cleaning liquid stored in the back tank 113 to the back WW 102, the back LC 104, and the back camera cleaner 109b.

Each of the cleaners 101 to 109b is provided with an actuator that opens the nozzle to discharge the cleaning liquid to the object to be cleaned. The actuator provided in each of the cleaners 101 to 109b is electrically connected to the cleaner control unit 116. In addition, the cleaner control unit 116 is also electrically connected to the front pump 112, the back pump 114, and the vehicle control unit 3.

Figure 4:
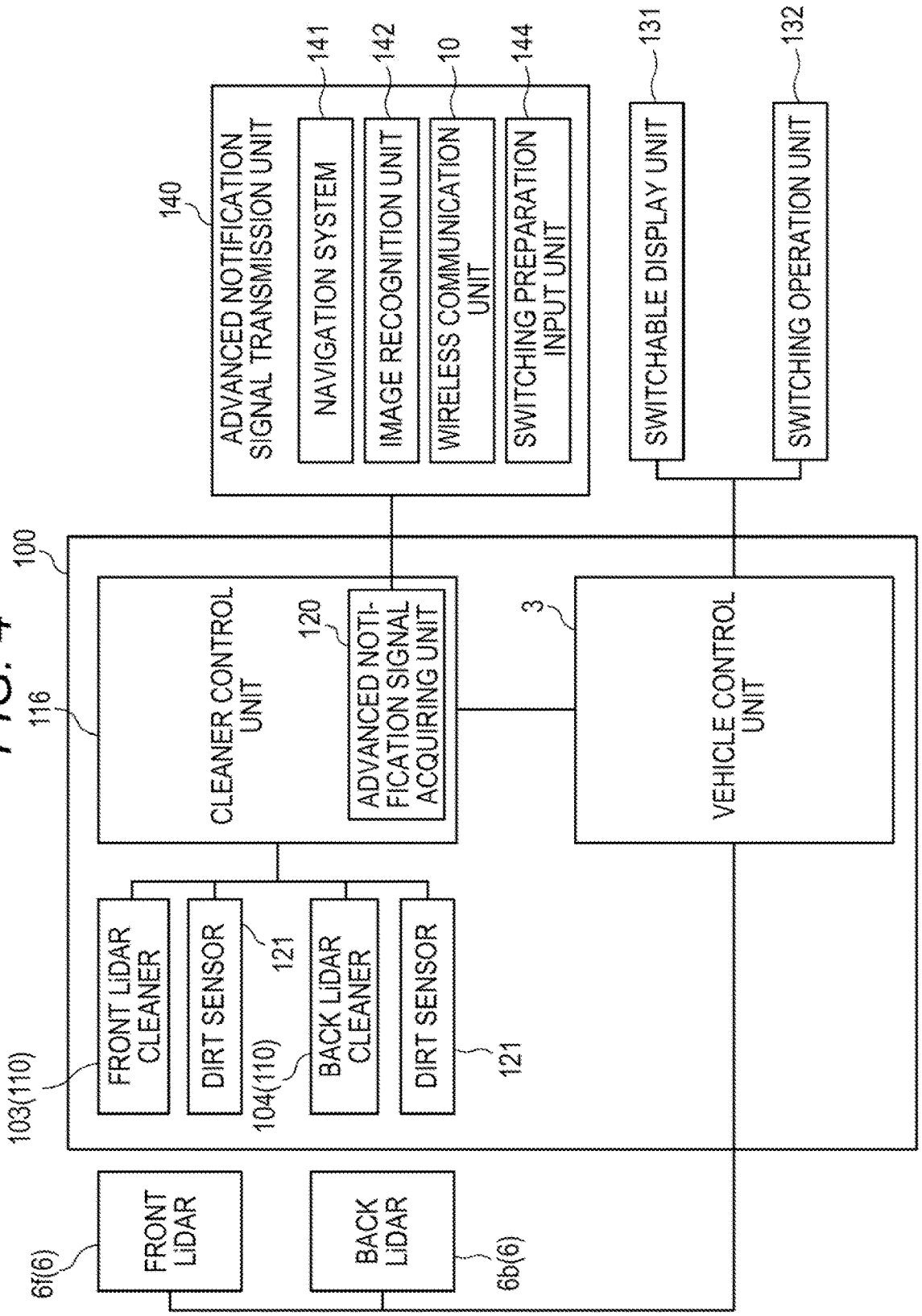
FIG. 4 is a block diagram of a main part of a vehicle cleaner system according to an embodiment of the present invention.

FIG. 4 is a block diagram of a main part of the vehicle cleaner system 100 according to the embodiment of the present invention. As shown in FIG. 4, the vehicle cleaner system 100 includes the cleaner units 110 that clean the external sensors 6, the cleaner control unit 116 that controls the operations of the cleaner units 110, and an advanced notification signal acquiring unit 120. Although only the front LC 103 and the back LC 104 are shown as the cleaner units 110 in FIG. 4, it is needless to say that the vehicle cleaner system 100 includes the other cleaner units 110 as shown in FIG. 3.

The cleaner control unit 116 is configured to control each cleaner unit 110. The cleaner control unit 116 is configured by, for example, at least one electronic control unit (ECU). The electronic control unit may include at least one microcontroller including one or more processors and one or more memories, and another electronic circuit including an active element such as a transistor and a passive element. The processor is, for example, a central processing unit (CPU), a micro processing unit (MPU), and/or a graphics processing unit (GPU). The CPU may be configured by a plurality of CPU cores. The GPU may be configured by a plurality of GPU cores. The memory includes a read only memory (ROM) and a random access memory (RAM). A control program for the cleaner unit 110 may be stored in the ROM.

The processor may be configured to load a program designated from a program group stored in the ROM onto the RAM and execute various processes in cooperation with the RAM. In addition, the electronic control unit (ECU) may be configured by an integrated circuit (hardware resource) such as an application specific integrated circuit (ASIC) or a field-programmable gate array (FPGA). Further, the electronic control unit may be configured by a combination of at least one microcontroller and an integrated circuit.

In the present embodiment, the vehicle cleaner system 100 includes dirt sensors 121 that can detect whether or not the respective external sensors 6 are clean, and the vehicle control unit 3. The vehicle control unit 3 is connected to a switchable display unit 131 and a switching operation unit 132. The switchable display unit 131 is a display device that displays that the vehicle control unit 3 is in a state in which the autonomous driving mode is executable. The switchable display unit 131 can be configured by a lamp, a display, or the like, for example. The switching operation unit 132 is an operator operated by the user to cause the vehicle control unit 3 to execute the autonomous driving mode. The switching operation unit 132 can be configured by a button, a switch, a lever, a touch display, or the like. The switchable display unit 131 may be integrated with the switching operation unit 132.

The advanced notification signal acquiring unit 120 acquires, from a switching advanced notification signal transmission unit 140, a switching advanced notification signal for notifying that the host vehicle 1 is entering an area in which the driving mode can be switched from the manual driving mode to the autonomous driving mode. In the present embodiment, the switching advanced notification signal transmission unit 140 includes a navigation system 141, an image recognition unit 142, a wireless communication unit 10, and a switching preparation input unit 144. The switching preparation input unit 144 is a user-operable operator for notifying the vehicle control unit 3 that the host vehicle 1 has entered an area in which the driving mode can be switched from the manual driving mode to the autonomous driving mode. The switching preparation input unit 144 may be configured by a button, a switch, a lever, a touch display, or the like.

In the present embodiment, when the advanced notification signal acquiring unit 120 acquires the switching advanced notification signal, the vehicle control unit 3 causes the switchable display unit 131 to display that the autonomous driving mode is executable. In this state, when the switching operation unit 132 is operated to input a signal for executing the autonomous driving mode to the vehicle control unit 3, the vehicle control unit 3 executes the autonomous driving mode.

Figure 5:
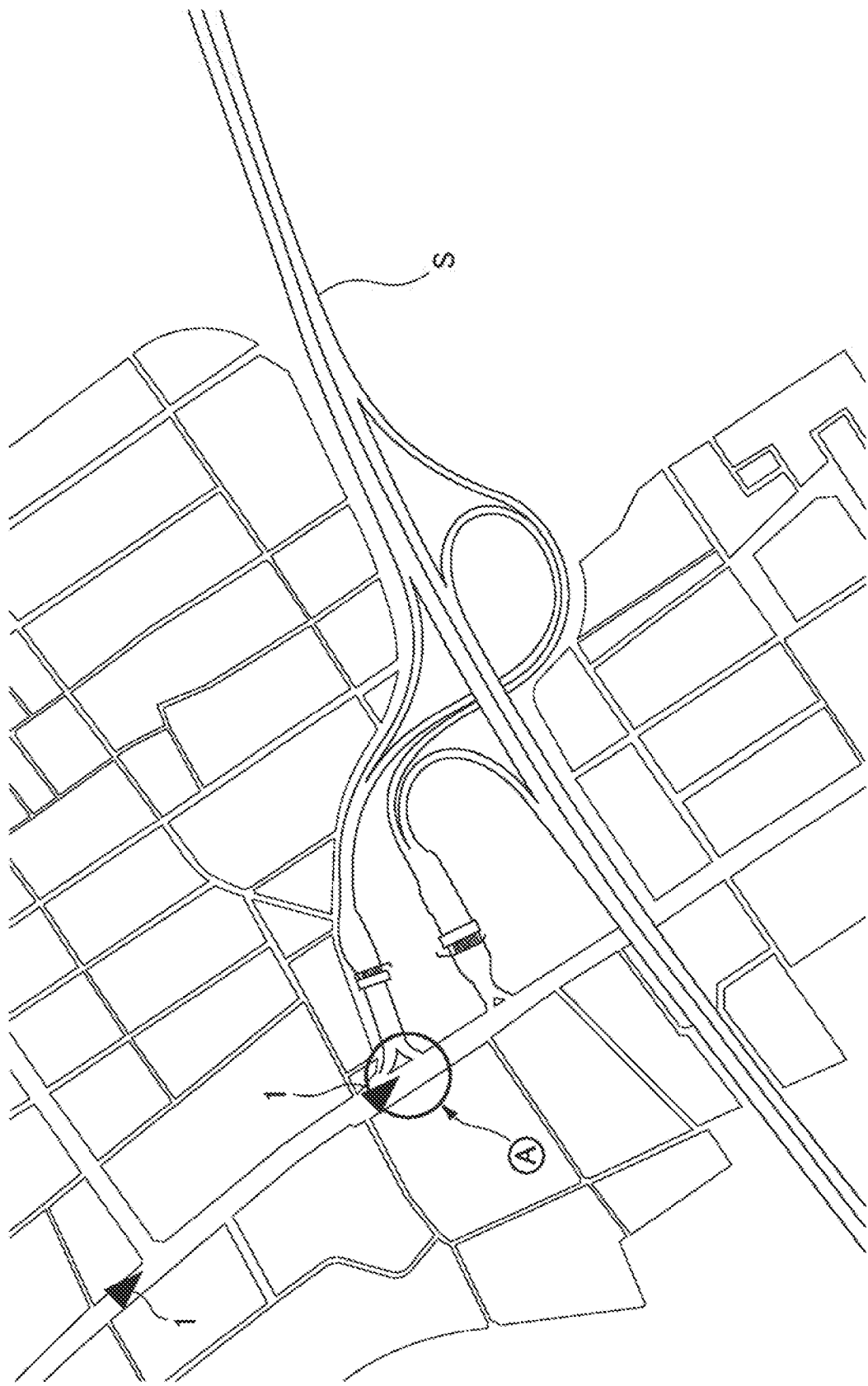
FIG. 5 is a schematic view showing a position of a host vehicle.

Next, the switching advanced notification signal will be described with reference to FIG. 5. FIG. 5 is a schematic view showing a position of the host vehicle 1. In the present embodiment, it is assumed that an expressway S is an area in which the vehicle is allowed to travel in the autonomous driving mode. As shown in FIG. 5, a transmission device that emits a wireless signal notifying that the vehicle is allowed to travel in the autonomous driving mode on the road S is installed at an entrance of the expressway S. In FIG. 5, the area in which strength of the wireless signal emitted from the transmission device is equal to or larger than a predetermined value is indicated by a symbol A. When the host vehicle 1 is entering the area A, the wireless communication unit 10, which is the switching advanced notification signal transmission unit 140, acquires the wireless signal emitted from the transmission device, and outputs the switching advanced notification signal to the advanced notification signal acquiring unit 120. In addition, in a case where the host vehicle is located outside the area A, a switchable signal is not input to the advanced notification signal acquiring unit 120.

Figure 6:
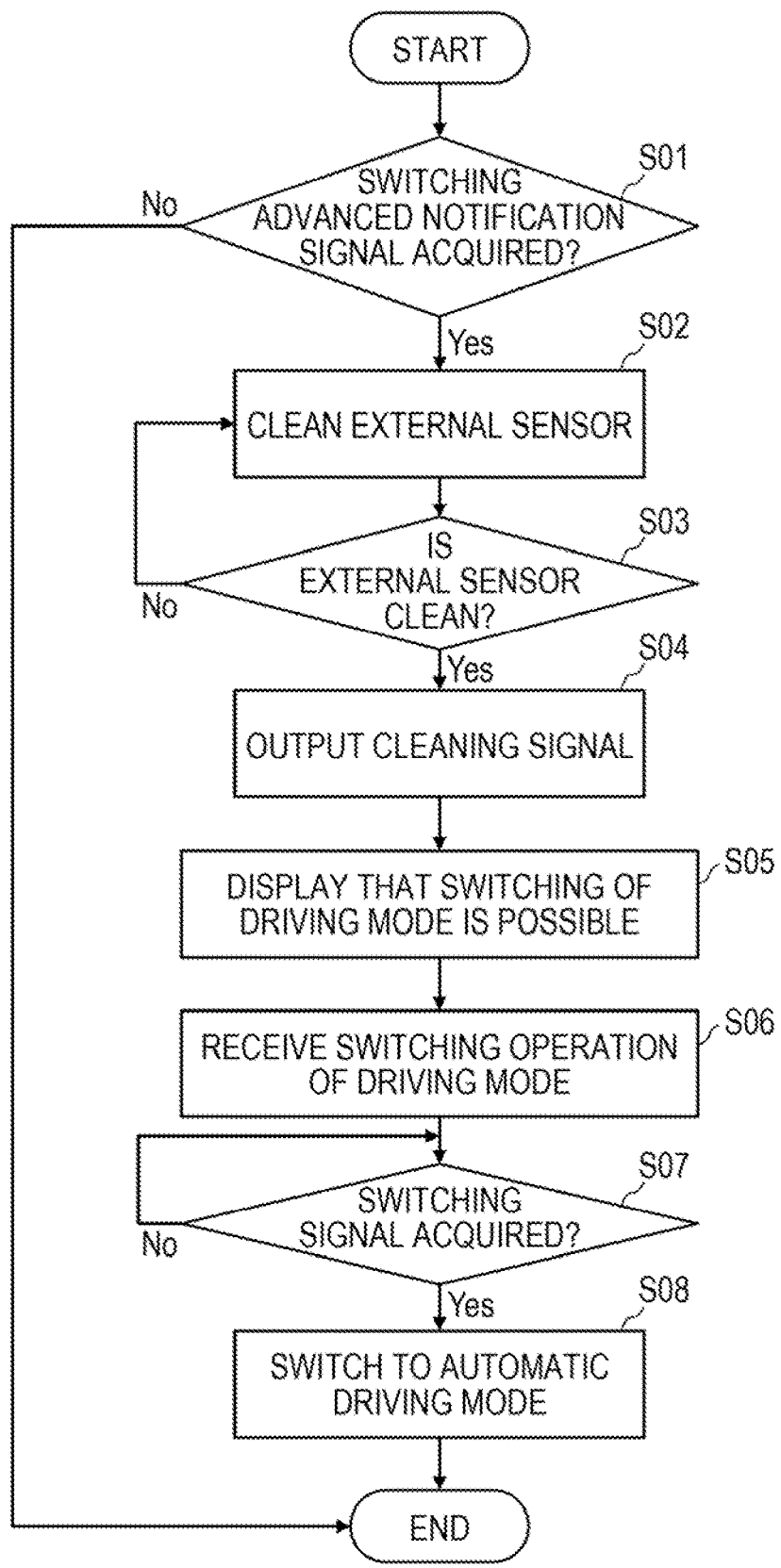
FIG. 6 is a flowchart executed by the vehicle cleaner system according to the embodiment of the present invention.

FIG. 6 is a flowchart executed by the cleaner control unit 116. As shown in FIG. 6, first, the cleaner control unit 116 determines whether or not the advanced notification signal acquiring unit 120 has acquired the switching advanced notification signal (step S01). In a case where the host vehicle 1 is located outside the area A and the advanced notification signal acquiring unit 120 does not acquire the switching advanced notification signal (step S01: No), the cleaner control unit 116 ends the process.

In a case where the host vehicle 1 is located in the area A and the advanced notification signal acquiring unit 120 acquires the switching advanced notification signal (step S01: Yes), the cleaner control unit 116 drives the cleaner unit 110 to clean the external sensor 6 (step S02).

In step S02, the cleaner control unit 116 may drive at least one of the cleaner units 110, or may operate all the cleaner units 110. However, since sensitivity of the external sensor 6 that acquires the external information in front is required when the autonomous driving mode is executed, it is preferable to operate at least the front camera cleaner 109a for cleaning the front camera 6c that acquires the information on the front side of the vehicle and the front LC 103 for cleaning the front LiDAR 6f.

Next, the cleaner control unit 116 determines whether or not the external sensor 6 is clean based on an output from the dirt sensor 121 (step S03).

In a case where the cleaner control unit 116 determines in step S03 that the external sensor 6 is still dirty (step S03: No), the cleaner control unit 116 returns to step S02 to drive the cleaner unit 110 to clean the external sensor 6.

In a case where the cleaner control unit 116 determines in step S03 that the external sensor 6 is clean (step S03: Yes), the cleaner control unit 116 outputs a cleaning signal indicating that the external sensor 6 is clean to the vehicle control unit 3 (step S04).

When the vehicle control unit 3 acquires the cleaning signal from the cleaner control unit 116, the vehicle control unit 3 causes the switchable display unit 131 to display that switching from the manual driving mode to the autonomous driving mode is possible (step S05). Further, when the vehicle control unit 3 acquires the cleaning signal from the cleaner control unit 116, the vehicle control unit 3 starts receiving a signal from the switching operation unit 132 (step S06). Incidentally, steps S05 and S06 may be executed in a reverse order or may be executed at the same time.

Subsequently, the vehicle control unit 3 determines whether or not a switching signal of the user to cause the vehicle control unit 3 to execute the autonomous driving mode has been acquired from the switching operation unit 132 (step S07).

The vehicle control unit 3 repeatedly executes step S07 until the switching signal is acquired (step S07: No).

When the vehicle control unit 3 acquires the switching signal (step S07: Yes), the vehicle control unit 3 ends execution of the manual driving mode, and executes the autonomous driving mode (step S08). That is, the driving mode is switched from the manual driving mode to the autonomous driving mode. Incidentally, the vehicle control unit 3 is configured not to perform switching of the driving mode even when the switching signal is input from the switching operation unit 132 unless the step S06 is executed.

As described above, according to the vehicle cleaner system 100 according to the present embodiment, when the vehicle control unit 3 switches from the manual driving mode to the autonomous driving mode, the vehicle control unit 3 is configured to, after the cleaner control unit 116 causes the cleaner unit 110 to clean the external sensor 6, switch from the manual driving mode to the autonomous driving mode. Therefore, when the autonomous driving mode is executed, the external sensor 6 can be kept clean at all times.

According to the vehicle cleaner system 100 according to the present embodiment, the cleaner control unit 116 is configured to, when a switching advanced notification acquiring unit has acquired the switching advanced notification signal, clean the external sensor 6 by the cleaner unit 110. Therefore, the external sensor 6 can be in a clean state before the autonomous driving mode is executed, and the sensitivity of the external sensor 6 when the autonomous driving mode is executed can be increased.

That is, unlike the vehicle cleaner system 100 according to the present embodiment, in a configuration in which the switching advanced notification signal is not acquired, even when the user operates the switching operation unit to switch from the manual driving mode to the autonomous driving mode, if the external sensor is not clean, the vehicle control unit cannot execute the autonomous driving mode based on the external information having high reliability. Therefore, even if the cleaner unit attempts to clean the external sensor before switching from the manual driving mode to the autonomous driving mode, it takes time to clean the external sensor. Therefore, it is not possible to respond to meet the user's request to immediately switch the driving mode.

According to the vehicle cleaner system 100 according to the present embodiment, by cleaning the cleaner unit 110 based on the switching advanced notification signal, the vehicle control unit 3 can be configured to switch the driving mode immediately when the switching signal has been acquired, and it is easy to meet the user's request to immediately switch the driving mode.

According to the vehicle cleaner system 100 according to the present embodiment, the cleaner control unit 116 is configured to output the cleaning signal to the vehicle control unit 3 when it is determined that the external sensor 6 is clean, and to display on the switchable display unit 131 that the autonomous driving mode is executable. Therefore, the user can grasp whether or not the autonomous driving mode is executable immediately after the cleaner unit 110 is clean.

According to the vehicle cleaner system 100 according to the present embodiment, when the vehicle control unit 3 acquires the switching signal from the switching operation unit 132, which is operable by the user, while the switchable display unit 131 displays that the autonomous driving mode is executable, the vehicle control unit 3 is configured to end the manual driving mode and execute the autonomous driving mode. Therefore, the user can visually determine whether or not the vehicle is in a state in which the autonomous driving mode is executable.

Figure 7:
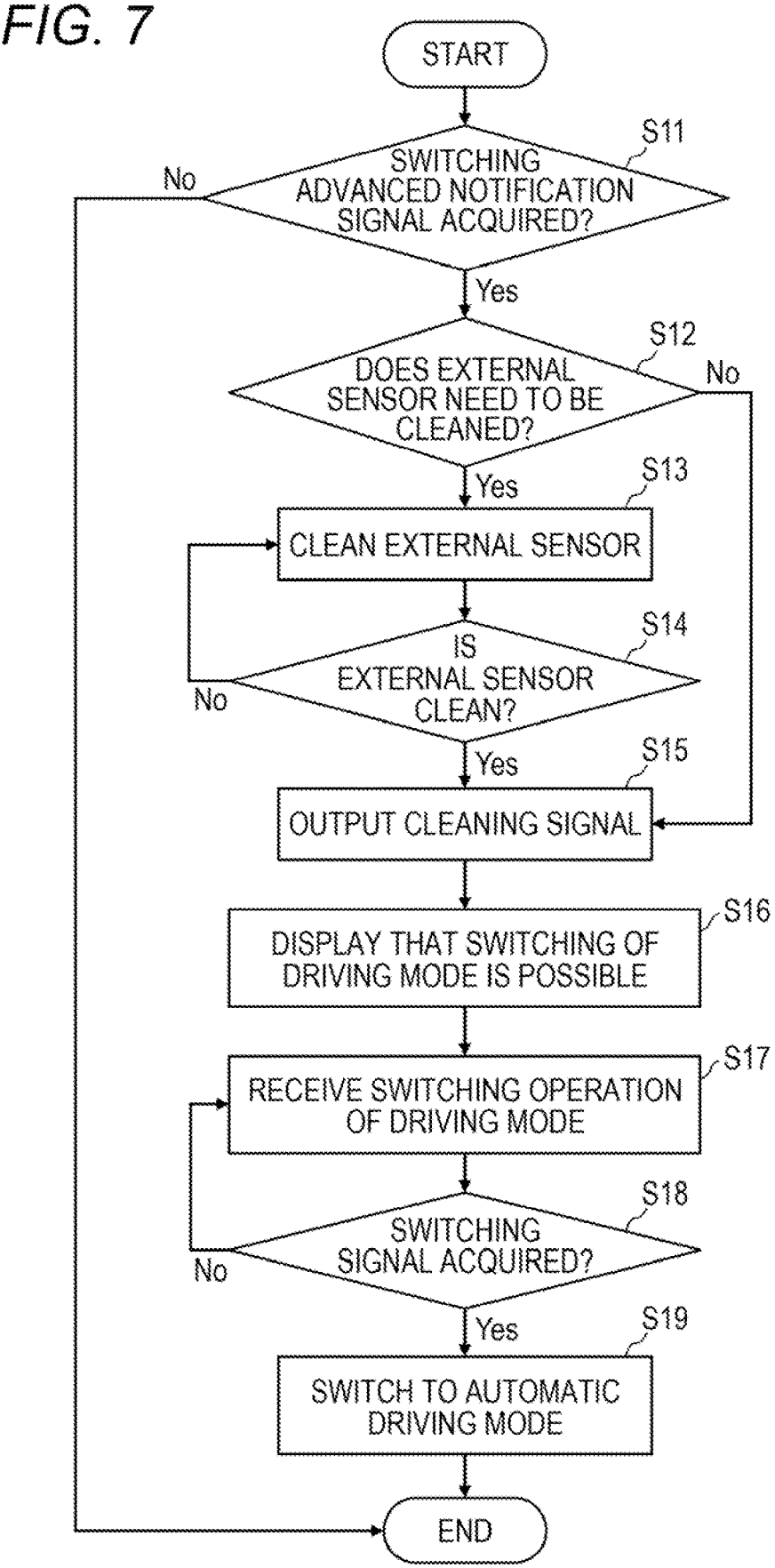
FIG. 7 is a flowchart executed by a vehicle cleaner system according to a first modification of the present invention.

In the embodiment described above, the example in which the vehicle cleaner system 100 is configured to clean the external sensor 6 when acquiring the switching advanced notification signal has been described, but the present invention is not limited thereto. FIG. 7 is a flowchart executed by the vehicle cleaner system 100 according to a first modification of the present invention.

In the flowchart shown in FIG. 7, after the switching advanced notification signal is acquired (step S11: Yes), the cleaner control unit 116 determines whether or not the external sensor 6 needs to be cleaned (step S12).

The cleaner control unit 116 may be configured to determine whether or not the external sensor 6 needs to be cleaned based on the output from the dirt sensor 121. Alternatively, the cleaner control unit 116 may be configured to determine whether or not the external sensor 6 needs to be cleaned based on weather information.

The weather information is, for example, weather information provided from the outside acquired by the wireless communication unit 10, information output from the raindrop sensor 124 indicating that rain is falling, or the like. In a case where it is raining, there is a high possibility that dirt adheres to the external sensor 6 due to muddy water or the like splashed by a vehicle traveling ahead of the host vehicle 1. Alternatively, in a case where the strong wind is blown, the dust is likely to adhere to the external sensor 6. As described above, the weather in which the dirt is likely to adhere to the external sensor 6 is recorded in the memory as a predetermined weather condition. The cleaner control unit 116 reads the predetermined weather condition from the memory and collates it with the weather information to determine whether or not the acquired weather information matches the predetermined weather condition. In this manner, the cleaner control unit 116 may be configured to determine whether or not the external sensor 6 needs to be cleaned based on the weather information.

In a case where the cleaner control unit 116 determines that the external sensor 6 needs to be cleaned (step S12: Yes), the cleaner control unit 116 drives the cleaner unit 110 to clean the external sensor 6 (step S13).

In a case where the cleaner control unit 116 determines that the external sensor 6 does not need to be cleaned (step S12: No), since the external sensor 6 is clean, the cleaner control unit 116 outputs the cleaning signal to the vehicle control unit 3 (step S15).

Incidentally, the determination as to whether or not the external sensor 6 needs to be cleaned in step S12 may be performed on all the external sensors 6 or may be determined only for a specific external sensor 6. In a case where it is determined that the specific external sensor 6 needs to be cleaned, all the external sensors 6 may be cleaned. Since subsequent processes are the same as those of the flowchart of FIG. 6 described above, a detailed description thereof will be omitted.

According to the vehicle cleaner system 100 according to the first modification, since the already clean external sensor 6 is not cleaned, the cleaning medium can be saved.

According to the vehicle cleaner system 100 according to the first modification, the cleaner control unit 116 is configured to, after the switching advanced notification signal is acquired and the determination is performed to ascertain whether or not the external sensor 6 needs to be cleaned, output the cleaning signal to the vehicle control unit 3 when it is determined that the external sensor 6 does not need to be cleaned, and cause the switchable display unit 131 to display that the autonomous driving mode is executable.

Therefore, the cleaning medium can be saved without cleaning the already clean external sensor 6.

According to the vehicle cleaner system 100 according to the first modification, the cleaner control unit 116 is configured such that after the switching advanced notification signal is acquired and the determination is performed to ascertain whether or not the external sensor 6 needs to be cleaned, the external sensor 6 is cleaned by the cleaner unit 110 when it is determined that the external sensor 6 needs to be cleaned, after the external sensor 6 is cleaned, a determination is performed to ascertain whether or not the external sensor 6 is clean, and when it is determined that the external sensor 6 is clean, the cleaning signal is output to the vehicle control unit 3 to display on the switchable display unit 131 that the autonomous driving mode is executable.

Therefore, by cleaning only the external sensor 6 that needs to be cleaned, the external sensor 6 can be kept in the clean state when the autonomous driving mode is executed while saving the cleaning medium.

The autonomous driving vehicle 1 of the present embodiment includes the vehicle control unit 3 capable of selectively executing the autonomous driving mode in which at least one of the accelerator control signal, the brake control signal, and the steering control signal is generated in accordance with the output from the external sensor 6 that acquires information on the outside the vehicle 1 and the manual driving mode in which the accelerator control signal, the brake control signal, and the steering control signal are generated independently of the output from the external sensor 6, the cleaner unit 110 configured to clean the external sensor 6, and the cleaner control unit 116 configured to control the cleaner unit 110.

In the autonomous driving vehicle 1, the cleaner control unit 116 is configured such that the switching advanced notification signal is able to be acquired from the navigation system 141, the wireless communication unit 10 or the image recognition unit 142 that notifies that the host vehicle is entering the area in which the autonomous driving mode is executable, or from the switching preparation input unit operated by the user, the cleaner control unit 116 is configured such that, when the switching advanced notification signal has been acquired, the external sensor 6 is cleaned by the cleaner unit 110 or a diagnosis is performed to ascertain whether or not the external sensor 6 needs to be cleaned by the cleaner unit 110, and the vehicle control unit 3 is configured such that when the switching signal is acquired from the switching operation unit operated by the user after external sensor 6 is cleaned or after the diagnosis is performed to ascertain whether or not the external sensor 6 needs to be cleaned, the manual driving mode is ended and the autonomous driving mode is executed.

Figure 8:
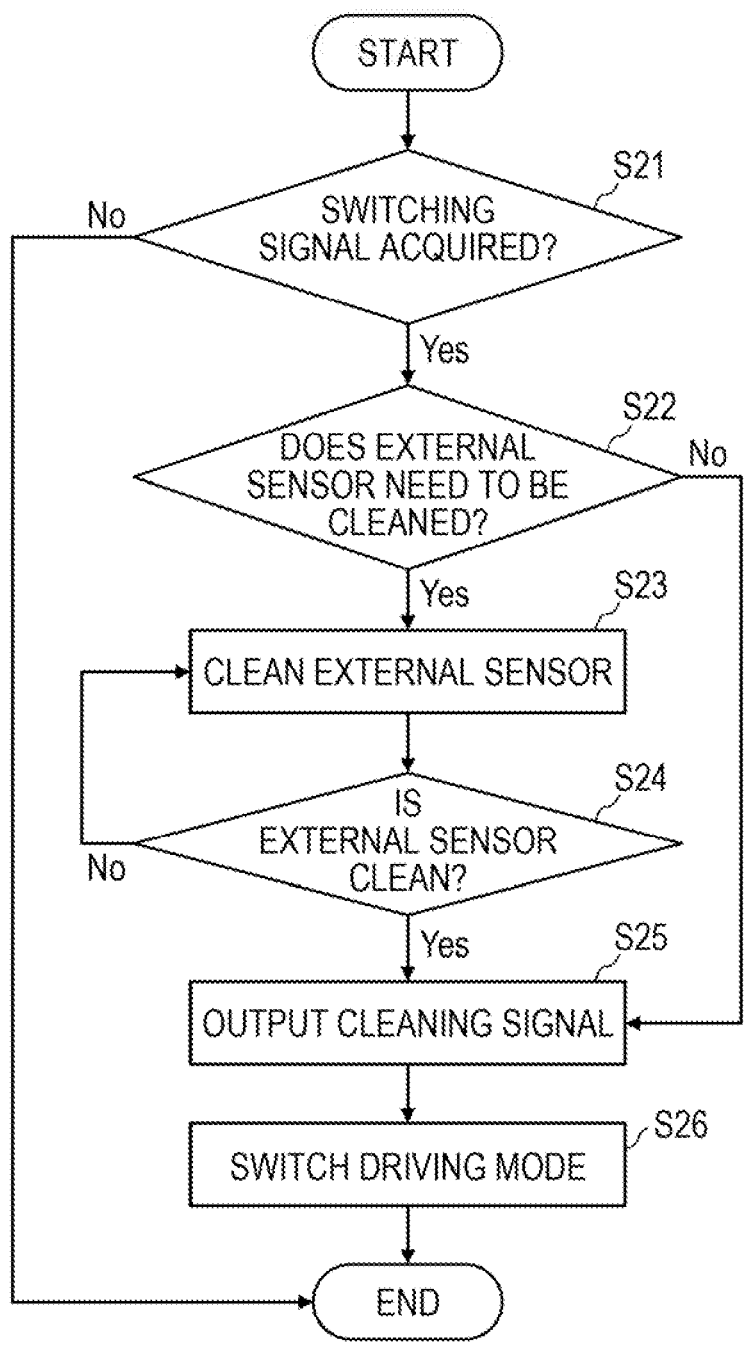
FIG. 8 is a flowchart executed by a vehicle cleaner system according to a second modification of the present invention.

Although the configuration in which the vehicle cleaner system 100 acquires the switching advanced notification signal has been described in the embodiment and the first modification described above, the present invention is not limited thereto. FIG. 8 is a flowchart executed by the vehicle cleaner system 100 according to a second modification of the present invention.

As shown in FIG. 8, first, the vehicle control unit 3 acquires the switching signal for switching from the manual driving mode to the autonomous driving mode (step S21). The vehicle control unit 3 repeats this process until the switching signal is acquired.

When the vehicle control unit 3 acquires the switching signal (step S21: Yes), the cleaner control unit 116 determines whether or not the external sensor 6 needs to be cleaned (step S22).

If the external sensor does not need to be cleaned (step S22: No), the cleaner control unit 116 outputs the cleaning signal indicating that the external sensor 6 is clean to the vehicle control unit 3 (step S25).

If the external sensor 6 needs to be cleaned (step S22: Yes), the cleaner control unit 116 operates the cleaner unit 110 to clean the external sensor 6 (step S23). Next, the cleaner control unit 116 determines whether or not the external sensor is clean (step S24). If the external sensor 6 is clean (step S24: Yes), the cleaner control unit 116 outputs the cleaning signal to the vehicle control unit 3 (step S25). If the external sensor 6 is not clean (step S24: No), the cleaner control unit 116 operates the cleaner unit 110 to clean the external sensor 6 again (step S23).

After the cleaning signal is acquired from the cleaner control unit 116 (step S25), the vehicle control unit 3 ends the execution of the manual driving mode, and executes the autonomous driving mode.

Also in the second modification, when the vehicle control unit 3 switches from the manual driving mode to the autonomous driving mode, the vehicle control unit 3 is configured to switch from the manual driving mode to the autonomous driving mode after the cleaner control unit 116 diagnoses whether or not the external sensor 6 needs to be cleaned. Therefore, the external sensor 6 can be kept in the clean state at all times when the vehicle control unit 3 executes the autonomous driving mode. In the present modification, when the vehicle control unit 3 switches from the manual driving mode to the autonomous driving mode, the vehicle control unit 3 may be configured to switch from the manual driving mode to the autonomous driving mode after the cleaner control unit 116 causes the cleaner unit 110 to clean the external sensor 6.

Various Modifications

Although the embodiment of the present invention has been described above, it goes without saying that the technical scope of the present invention should not be interpreted as being limited by the description of the present embodiment. It is to be understood by those skilled in the art that the present embodiment is merely an example and various modifications can be made within the scope of the invention described in the claims. The technical scope of the present invention should be determined based on the scope of the invention described in the claims and the equivalent scope thereof.

Further, in the above-described embodiment, a configuration in which the cleaner system 100 includes the external sensor 6 has been described, but the cleaner system 100 may be configured not to include the external sensor 6. However, it is preferable that the cleaner system 100 is configured as an assembly including the external sensor 6 because positioning accuracy of the cleaners 103 to 106, 109*a* and 109*b* with respect to the external sensor 6 can be easily increased. In addition, since the external sensors 6 can also be incorporated together when the cleaner system 100 is mounted on the vehicle 1, the ease of assembly to the vehicle 1 is also enhanced.

In the embodiment described above, as a cleaner for cleaning the external sensor 6, the cleaners 103 to 106 for cleaning the LiDARs 6*f*, 6*b*, 6*r*, and 6*l*, the cleaner 109*a* for cleaning the front camera 6*c*, and the cleaner 109*b* for cleaning the back camera 6*d* have been described, but the present invention is not limited thereto. The cleaner system 100 may include a cleaner for cleaning a radar, or the like, instead of the sensor cleaners 103 to 106, 109*a*, and 109*b*, or may include the cleaner with the sensor cleaners 103 to 106, 109*a*, and 109*b*.

Note that the external sensor 6 such as the LiDARs 6*f*, 6*b*, 6*r*, and 6*l* may have a detection surface and a cover that covers the detection surface. The cleaner for cleaning the external sensor 6 may be configured to clean the detection surface, or may be configured to clean the cover that covers the sensor.

The cleaning liquid discharged by the cleaner system 100 includes water or a detergent. The cleaning mediums to be discharged to the front and rear windows 1*f*, 1*b*, the headlamps 7*r*, 7*l*, the LiDARs 6*f*, 6*b*, 6*r*, 6*l*, and the cameras 6*c*, 6*d* may be different or may be the same.

In the embodiment described above, the example in which the cleaners 101, 103, 105 to 109*b* are connected to the front tank 111 and the cleaners 102, 104 are connected to the back tank 113 has been described above, but the present invention is not limited thereto. The cleaners 101 to 109*b* may be connected to a single tank. The cleaners 101 to 109*b* may be connected to tanks different from each other.

Alternatively, the cleaners 101 to 109*b* may be connected to a common tank for each type of an object to be cleaned thereof. For example, the LCs 103 to 106 may be connected to a common first tank, and the HCs 107, 108 may be connected to a second tank different from the first tank.

Alternatively, the cleaners 101 to 109*b* may be connected to a common tank for each arrangement position of the object to be cleaned. For example, the front WW 101, the front LC 103, and the front camera cleaner 109*a* may be connected to a common front tank, the right LC 105 and the right HC 107 may be connected to a common right tank, the back WW 102, the back WW 104, the back camera cleaner 109*b* may be connected to a common back tank, and the left LC 106 and the left HC 108 may be connected to a common left tank.

In the embodiment described above, an example in which the cleaning medium is discharged from the cleaners 101 to 109*b* by operating the actuators provided in the cleaners 101 to 109*b* has been described above, but the present invention is not limited thereto.

Each of the cleaners 101 to 109*b* is provided with a normally closed valve, the pump is operated such that a pressure between the tank and each of the cleaners 101 to 109*b* is always high. The cleaner control unit 116 may open the valves provided in the cleaners 101 to 109*b* to discharge the cleaning mediums from the cleaners 101 to 109*b*.

Alternatively, each of the cleaners 101 to 109*b* is connected to an individual pump, and the cleaner control unit 116 may control each pump individually to control the discharge of the cleaning mediums from the cleaners 101 to 109*b*. In this case, each of the cleaners 101 to 109*b* may be connected to different tanks, or may be connected to a common tank.

The cleaners 101 to 109*b* are provided with one or more discharge holes for discharging the cleaning medium. The cleaners 101 to 109*b* may be provided with one or more discharge holes for discharging the cleaning liquid and one or more discharge holes for discharging air.

Each of the cleaners 101 to 109*b* may be individually provided, or the plurality of the cleaners 101 to 109*b* may be formed as a unit. For example, the right LC 105 and the right HC 107 may be configured as a single unit. In contrast to an aspect in which the right headlamp 7*r* and the right LiDAR 6*r* are integrated, the right LC 105 and the right HC 107 may be configured as a single unit.

In the embodiment shown in FIG. 4, an example in which the advanced notification signal acquiring unit 120 is incorporated in the electronic control unit forming the cleaner control unit 116 is shown, but the advanced notification signal acquiring unit 120 may be incorporated in the electronic control unit forming the vehicle control unit 3, or may be configured separately from the cleaner control unit 116 and the vehicle control unit 3. In addition, a single electronic control unit may function as both the cleaner control unit 116 and the vehicle control unit 3.

In the example shown in FIG. 4, the example in which the wireless communication unit 10 functions as the switching advanced notification signal transmission unit 140 has been described, but the present invention is not limited to this. The navigation system 141 sets a scheduled course of the host vehicle. There is a case in which the area in which the vehicle is allowed to travel in the autonomous driving mode is included in the scheduled course. In this case, the navigation system 141 as the switching advanced notification signal transmission unit 140 may be configured to output the switching advanced notification signal to the advanced notification signal acquiring unit 120 when the host vehicle arrives a point in front of a predetermined length (for example, 1 km before) from the area.

When the front camera 6*c* captures an image of a sign or the like indicating the area in which the vehicle is allowed to travel in the autonomous driving mode and the image recognition unit 142 recognizes the sign, the image recognition unit 142 functioning as the switching advanced notification signal transmission unit 140 may be configured to transmit the switching advanced notification signal to the advanced notification signal acquiring unit 120.

Alternatively, by pressing the switch preparation input unit 144 when the vehicle has entered the area in which the vehicle is allowed to travel in the autonomous driving mode by the user, the switching preparation input unit 144 functioning as the switching advanced notification signal transmission unit 140 may be configured to transmit the switching advanced notification signal to the advanced notification signal acquiring unit 120.

Alternatively, the switching preparation input unit 144 may also serve as a driving mode switching unit operated by the user to switch the driving mode of the vehicle. The switching advanced notification signal may be transmitted when the user operates the driving mode switching unit once, the cleaner unit may be operated in response to the switching advanced notification signal, and the manual driving mode may be switched to the autonomous driving mode when the user operates the driving mode switching unit again in a state in which the external sensor is clean.

The present application is based on a Japanese Patent Application No. 2018-041033 filed on Mar. 7, 2018, the contents of which are incorporated herein by reference.

INDUSTRIAL APPLICABILITY

According to the present invention, there is provided the vehicle cleaner system capable of keeping the external sensor in the clean state when switching from the manual driving mode to the autonomous driving mode.

REFERENCE SIGNS LIST 1 vehicle
1b rear window
1f front window
2 vehicle system
3 vehicle control unit
5 internal sensor
6 external sensor
6b back LiDAR
6c front camera
6d back camera
6f front LiDAR
6l left LiDAR
6r right LiDAR
7 lamp
7l left headlamp
7r right headlamp
10 wireless communication unit
11 map information storage unit
12 steering actuator
13 steering device
14 brake actuator
15 brake device
16 accelerator actuator
17 accelerator device
100 vehicle cleaner system
101 front window washer (front WW)
102 back window washer (back WW)
103 front LiDAR cleaner (front LC)
104 back LiDAR cleaner (back LC)
105 right LiDAR cleaner (right LC)
106 left LiDAR cleaner (left LC)
107 right headlamp cleaner (right HC)
108 left headlamp cleaner (left HC)
109a front camera cleaner
109b back camera cleaner
110 cleaner unit
111 front tank
112 front pump
113 back tank
114 back pump
116 cleaner control unit
120 advanced notification signal acquiring unit
121 dirt sensor
124 raindrop sensor
131 switchable display unit
132 switching operation unit
140 switching advanced notification signal transmission unit
141 navigation system
142 image recognition unit
144 switching preparation input unit
S expressway

The invention claimed is:

1. A vehicle cleaner system mounted on an autonomous driving vehicle including a vehicle controller configured to selectively execute an autonomous driving mode in which an accelerator control signal, a brake control signal, and a steering control signal are generated in accordance with an output from an external sensor acquiring information on outside of the vehicle and an output from an internal sensor acquiring information of the vehicle and a manual driving mode in which the accelerator control signal, the brake control signal, and the steering control signal are generated independently of the output from the external sensor and the output from the internal sensor, the vehicle cleaner system comprising:
 a cleaner configured to discharge a cleaning medium to clean the external sensor; and
 a cleaner controller configured to control the cleaner and acquire a switching advanced notification signal for notifying that the vehicle, which is traveling in a first area in which a driving mode cannot be switched from the manual driving mode to the autonomous driving mode, will enter a second area in which a driving mode is capable of switching from the manual driving mode to the autonomous driving mode after a predetermined time based on the vehicle arriving at a point at a predetermined length in front of the second area,
 wherein, before the vehicle controller determines whether a user has requested to switch the manual driving mode to the autonomous driving mode, when the switching advanced information notification signal is acquired, the cleaner controller is configured to cause the cleaner to clean the external sensor or perform the diagnosis to ascertain whether or not the external sensor needs to be cleaned, and
 wherein after the cleaner controller causes the cleaner to clean the external sensor or after a diagnosis is performed to ascertain whether or not the external sensor needs to be cleaned, the vehicle controller is configured to:
  determine whether a switching signal indicating that the user has requested to switch the manual driving mode to the autonomous driving mode has been received, and
  based on the determination that the switch signal has been received, switch the manual driving mode to the autonomous driving mode.

2. The vehicle cleaner system according to claim 1, wherein the autonomous driving vehicle includes
 a switchable display configured to display to the user to indicate that the autonomous driving mode is executable, and
wherein the cleaner controller is configured to
 after the switching advanced notification signal is acquired and the external sensor is cleaned, perform a determination to ascertain whether or not the external sensor is clean, and output a cleaning signal to the vehicle controller when it is determined that the external sensor is clean, and the switchable display is configured to display that the autonomous driving mode is executable.

3. The vehicle cleaner system according to claim 1, wherein the autonomous driving vehicle includes
a switchable display configured to display to the user that the autonomous driving mode is executable, and
wherein the cleaner controller is configured to, after the switching advanced notification signal is acquired and a determination is performed to ascertain whether or not the external sensor needs to be cleaned, output a cleaning signal to the vehicle controller when it is determined that the external sensor does not need to be cleaned, and the switchable display is configured to display to indicate that the autonomous driving mode is executable.

4. The vehicle cleaner system according to claim 3, wherein the cleaner controller is configured to
after the switching advanced notification signal is acquired and the determination is performed to ascertain whether or not the external sensor needs to be cleaned, when it is determined that the external sensor needs to be cleaned, cause the cleaner to clean the external sensor,
perform a determination to ascertain whether or not the external sensor is clean after cleaning the external sensor, and
when it is determined that the external sensor is clean, output the cleaning signal to the vehicle controller, and the switchable display is configured to display to indicate that the autonomous driving mode is executable.

5. The vehicle cleaner system according to claim 2, wherein the vehicle controller is configured to, when the switching signal is acquired from a switch, which is configured to be operable by the user while the switchable display displays that the autonomous driving mode is executable, end the manual driving mode and execute the autonomous driving mode.

6. The vehicle cleaner system according to claim 1, wherein the switching advanced notification signal is based on a wireless signal that is transmitted from a transmitter installed on a road and that notifies that the vehicle is allowed to travel in the autonomous driving mode.

7. The vehicle cleaner system according to claim 1, wherein the switching advanced notification signal is a wireless signal that is transmitted from a transmitter installed on a road at an entrance of the area in which the driving mode is capable of switching from the manual driving mode to the autonomous driving mode when the vehicle enters a predetermined signal area in which a strength of the wireless signal from the transmitter is equal to or greater than a predetermined value.

8. An autonomous driving vehicle comprising:
a vehicle controller configured to selectively execute an autonomous driving mode in which at least one of an accelerator control signal, a brake control signal, and a steering control signal is generated in accordance with an output from an external sensor acquiring information on outside of the vehicle and an output from an internal sensor acquiring information of the vehicle and a manual driving mode in which the accelerator control signal, the brake control signal, and the steering control signal are generated independently of the output from the external sensor and the output from the internal sensor,
a cleaner configured to discharge a cleaning medium to clean the external sensor; and
a cleaner controller configured to control the cleaner,
wherein the cleaner controller is configured to acquire a switching advanced notification signal notifying that the vehicle will enter a second area in which the autonomous driving mode is executable after a predetermined time from a navigation system, a wireless communication unit or an image recognition unit configured to notify that the vehicle, which is traveling in a first area in which a driving mode cannot be switched from the manual driving mode to the autonomous driving mode, is entering a second area based on the vehicle arriving at a point in the first area at a predetermined length in front of the second area,
wherein, before the vehicle controller determines whether a user has requested to switch the manual driving mode to the autonomous driving mode, when the switching advanced notification signal has been acquired, the cleaner controller is configured to cause the cleaner to clean the external sensor or perform a diagnosis to ascertain whether or not the external sensor needs to be cleaned by the cleaner, and
wherein after the external sensor is cleaned by the cleaner or after the diagnosis is performed to ascertain whether or not the external sensor needs to be cleaned, the vehicle controller is configured to:
determine whether a switch signal indicating that the user has requested to switch the manual driving mode to the autonomous driving mode has been received, and
based on the determination to switch the driving mode, switch the manual driving mode to the autonomous driving mode.

9. The autonomous driving vehicle according to claim 8, wherein the switching advanced notification signal from the wireless communication unit is based on a wireless signal that is transmitted from a transmitter installed on a road and that notifies that the vehicle is allowed to travel in the autonomous driving mode.

10. The autonomous driving vehicle according to claim 8, wherein the switching advanced notification signal is a wireless signal that is transmitted from a transmitter installed on a road at an entrance of the area in which the driving mode is capable of switching from the manual driving mode to the autonomous driving mode when the vehicle enters a predetermined signal area in which a strength of the wireless signal from the transmitter is equal to or greater than a predetermined value.

* * * * *